US011624756B2

United States Patent
Li et al.

(10) Patent No.: US 11,624,756 B2
(45) Date of Patent: Apr. 11, 2023

(54) OPTICAL FIBER FLOW VELOCITY MEASURING APPARATUS AND METHOD INTEGRATING HIGH AND LOW RANGES

(71) Applicant: Laser Institute of Shandong Academy of Science, Shandong (CN)

(72) Inventors: Zhen Li, Shandong (CN); Jiqiang Wang, Shandong (CN); Yuhui Feng, Shandong (CN); Jiamin Wang, Shandong (CN); Tongyu Liu, Shandong (CN); Lin Zhao, Shandong (CN); Moyu Hou, Shandong (CN); Yuan Liu, Shandong (CN); Guofeng Dong, Shandong (CN)

(73) Assignee: Laser Institute of Shandong Academy of Science, Shandong (CN)

( * ) Notice: Subject to any disclaimer, the term of this patent is extended or adjusted under 35 U.S.C. 154(b) by 0 days.

(21) Appl. No.: 17/451,231

(22) Filed: Oct. 18, 2021

(65) Prior Publication Data
US 2022/0120779 A1  Apr. 21, 2022

(30) Foreign Application Priority Data

Oct. 16, 2020 (CN) .......................... 202011111126.8

(51) Int. Cl.
*G01P 5/26* (2006.01)
*G01F 1/002* (2022.01)

(52) U.S. Cl.
CPC ................ *G01P 5/26* (2013.01); *G01F 1/002* (2013.01)

(58) Field of Classification Search
CPC .................................. G01P 5/26; G01F 1/002
(Continued)

(56) References Cited

U.S. PATENT DOCUMENTS 4,914,959 A * 4/1990 Mylvaganam .......... G01P 5/245
73/861.28
2018/0299367 A1* 10/2018 Yan ..................... G01N 15/1436

FOREIGN PATENT DOCUMENTS

CN        202008491 U  * 10/2011

OTHER PUBLICATIONS

Translation of CN-202008491-U (Year: 2011).*

* cited by examiner

*Primary Examiner* — Nathaniel T Woodward
(74) *Attorney, Agent, or Firm* — K&L Gates LLP

(57) ABSTRACT

Disclosed is an optical fiber flow velocity measuring apparatus and method integrating high and low ranges. The apparatus includes an integrated optical fiber flow velocity sensor, the integrated optical fiber flow velocity sensor includes a sensor body; a fluid channel, a fluid through hole, a full-pressure channel, a static-pressure channel, a low-pressure chamber and a high-pressure chamber are provided inside the sensor body; a first optical fiber sensing element is provided between the low-pressure chamber and the high-pressure chamber; a second optical fiber sensing element is provided in the fluid through hole and is perpendicular to a flow direction of a fluid to be measured; the first optical fiber sensing element and the second optical fiber sensing element are sequentially connected in series through a single-mode optical fiber; both ends of the single-mode optical fiber are connected into a wavelength division multiplexer; a pump light source is connected with the wavelength division multiplexer through a common optical fiber; an optical fiber grating demodulator is connected with the wavelength division multiplexer through a common optical fiber; and a flow velocity arithmetic unit is electrically connected with a optical fiber grating demodulator. It's an object of the present disclosure to solve the problems that the (Continued)

electric circuit is too complicated and that it is not easy to integrate in one apparatus when flow velocity conversion devices based on different principles are integrated.

12 Claims, 3 Drawing Sheets

(58) Field of Classification Search
USPC .......................................................... 73/861
See application file for complete search history.

OPTICAL FIBER FLOW VELOCITY MEASURING APPARATUS AND METHOD INTEGRATING HIGH AND LOW RANGES

CROSS-REFERENCE TO RELATED APPLICATION

This application claims the benefit of and priority to Chinese Application No. 202011111126.8, filed Oct. 16, 2020, entitled OPTICAL FIBER FLOW VELOCITY MEASURING APPARATUS AND METHOD INTEGRATING HIGH AND LOW RANGES. The entire disclosure of which is incorporated herein by reference.

FIELD OF THE PRESENT DISCLOSURE

The present disclosure relates to the technical field of optical fiber sensing, and more particularly, to an optical fiber flow velocity measuring apparatus and method integrating high and low ranges.

BACKGROUND OF THE PRESENT DISCLOSURE

Flow velocity measurement has important applications in many fields such as petrochemical engineering, biomedicine, energy measurement, and environmental monitoring. At present, flow velocity sensors based on different principles, such as a differential pressure type, a vortex type, a hot wire type, and an ultrasonic type, have been used for fluid flow velocity measurement. However, these flow velocity sensors based on different principles are each defective in some aspects. For example, only the hot wire sensor has high enough sensitivity and precision in microfluidic and low-velocity detection, but its range is limited; the other types of flow velocity sensors are mainly used in high-velocity and macrofluidic situations, and have poor performance in microfluidic and low-velocity detection. The flow velocity sensors based on different principles transmit signal values such as differential pressure, temperature, and frequency in the form of electrical current signals to a flow velocity conversion device, and the flow velocity of the fluid is obtained through a series of operations. However, the calculation in each flow velocity sensor involves twice digital-to-analog signal conversions, which inevitably leads to reduced accuracy.

However, there are problems that the electric circuit is too complicated and that different sensing elements of different flow velocity sensors are not easy to integrate in one apparatus when flow velocity conversion devices based on different principles are integrated to improve the accuracy.

SUMMARY OF THE PRESENT DISCLOSURE

It's an object of the present disclosure to solve the problems that the electric circuit is too complicated and that integration is not easy apparatus when flow velocity conversion devices based on different principles are integrated by an optical fiber flow velocity measuring apparatus and method integrating high and low ranges.

In an aspect, an optical fiber flow velocity measuring apparatus integrating high and low ranges is provided, including:

an integrated optical fiber flow velocity sensor, comprising a sensor body, wherein the sensor body comprises a fluid contacting end and a sensing end; a fluid entrance and a full-pressure inlet are provided on an end surface of the fluid contacting end, and a fluid channel, a fluid through hole, a full-pressure channel, a static-pressure channel, a low-pressure chamber, and a high-pressure chamber are provided inside the sensor body; a static-pressure inlet is provided in a sidewall of the sensor body;

the fluid entrance, the fluid channel, and the fluid through hole are sequentially communicated, the full-pressure inlet, the full-pressure channel, and the high-pressure chamber are sequentially communicated, and the static-pressure inlet, the static-pressure channel, and the low-pressure chamber are sequentially communicated; a first optical fiber sensing element is provided between the low-pressure chamber and the high-pressure chamber; a second optical fiber sensing element is provided in the fluid through hole, and the second optical fiber sensing element is perpendicular to a flow direction of a fluid to be measured;

the first optical fiber sensing element comprises an elastic diaphragm, a first optical fiber grating, and a second optical fiber grating, wherein the first optical fiber grating and the second optical fiber grating are attached to two sides of the elastic diaphragm, respectively; the first optical fiber grating is close to the low-pressure chamber, and the second optical fiber grating is close to the high-pressure chamber; the second optical fiber sensing element comprises a third optical fiber grating; the first optical fiber grating, the second optical fiber grating, and the third optical fiber grating are sequentially connected in series through a single-mode optical fiber;

a wavelength division multiplexer, wherein both ends of the single-mode optical fiber are connected into the wavelength division multiplexer;

a pump light source connected with the wavelength division multiplexer through a common optical fiber;

an optical fiber grating demodulator connected with the wavelength division multiplexer through a common optical fiber; and a flow velocity arithmetic unit electrically connected with the optical fiber grating demodulator.

In another aspect, an optical fiber flow velocity measuring method integrating high and low ranges is provided, including:

placing the optical fiber flow velocity measuring apparatus integrating high and low ranges at a position to be measured, and configuring the fluid contacting end of the integrated optical fiber flow velocity sensor to face the flow direction of the fluid;

setting a critical value for the flow velocity;

starting the optical fiber flow velocity measuring apparatus integrating high and low ranges;

obtaining a first flow velocity value measured by the first optical fiber sensing element and a second flow velocity value measured by the second optical fiber sensing element;

comparing the first flow velocity value and the second flow velocity value with the critical value for the flow velocity;

outputting and displaying the first flow velocity value as a final flow velocity if the first flow velocity value and the second flow velocity value are both greater than the critical value for the flow velocity;

outputting and displaying the second flow velocity value as a final flow velocity if the first flow velocity value and the second flow velocity value are both smaller than or equal to the critical value for the flow velocity;

calculating a difference between the first flow velocity value and the critical value for the flow velocity and a difference between the second flow velocity value and the critical value for the flow velocity, respectively, and outputting and displaying a flow velocity value with the smallest difference as the final flow velocity, if one of the first flow velocity value and the second flow velocity value is greater than the critical value for the flow velocity while the other is smaller than the critical value for the flow velocity.

According to the optical fiber flow velocity measuring apparatus and method integrating high and low ranges provided herein, two optical fiber sensing elements based on different measurement principles, which are applicable to high and low ranges measurement, respectively, are provided. The wavelength variations of the gratings in the two optical fiber sensing elements are demodulated by the optical fiber grating demodulator to finally derive two flow velocities through calculation, and the final flow velocity is determined by setting the critical value for the flow velocity. Improved accuracy and sensitivity can be achieved by integrating low and high-range optical fiber sensing elements based on different sensing principles, selecting and outputting the final flow velocity according to specific measurement conditions. The optical fiber gratings reflect the fluid flow velocity through the wavelength variations caused by temperature and deformation, respectively. The apparatus is simple in overall structure and easy to implement.

BRIEF DESCRIPTION OF THE DRAWINGS

To more clearly illustrate the technical solution of the present disclosure, the drawings used in the embodiments will be briefly described below, and it would be obvious for a person skilled in the art to obtain other drawings according to these drawings without involving any inventive effort.

DESCRIPTION OF THE EMBODIMENTS

The technical solutions in the embodiments herein will be clearly and completely described below in conjunction with the drawings in the embodiments. Obviously, the embodiments described herein are only some, rather than all, of the embodiments of the present disclosure. All other embodiments obtained by those of ordinary skill in the art on the basis of the embodiments herein without inventive effort shall fall within the scope of the present disclosure.

Figure 1:
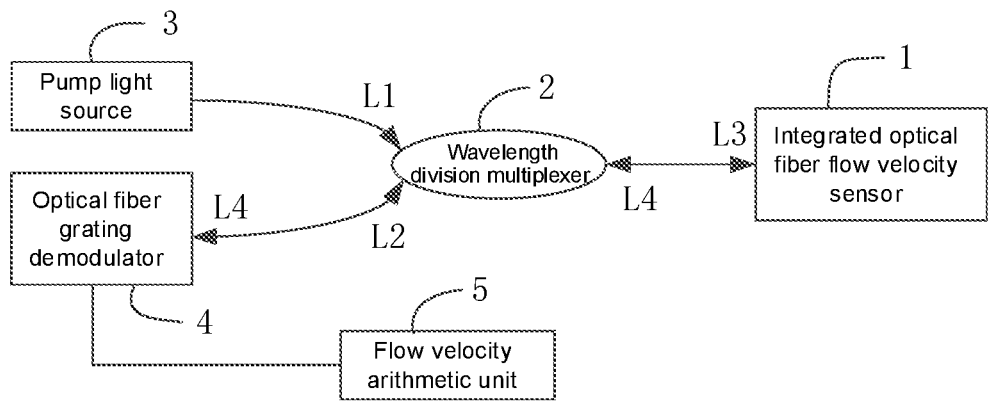
FIG. 1 is a topological diagram of a first optical fiber flow velocity measuring apparatus integrating high and low ranges provided by the present disclosure.
Figure 2:
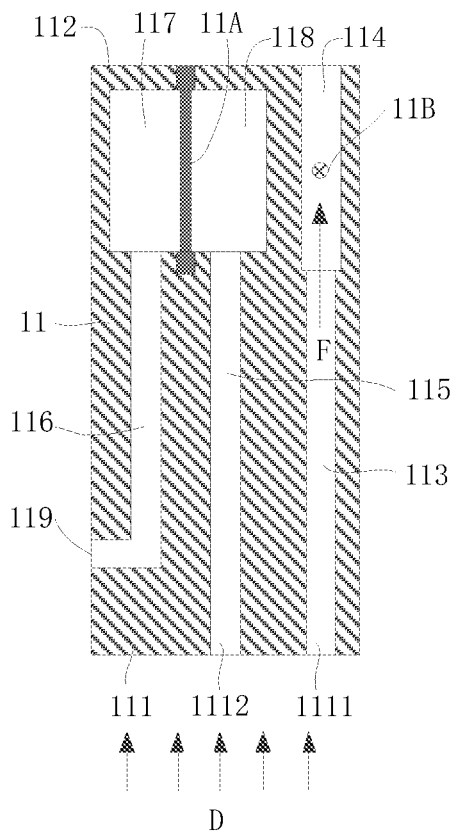
FIG. 2 is a block diagram of an integrated fiber optic flow velocity sensor of FIG. 1.

FIG. 1 is a topological diagram of a first optical fiber flow velocity measuring apparatus integrating high and low ranges provided by the present disclosure; FIG. 2 is a block diagram of an integrated fiber optic flow velocity sensor of FIG. 1. With reference to FIGS. 1 and 2, the embodiment herein provides an optical fiber flow velocity measuring apparatus integrating high and low ranges, including an integrated optical fiber flow velocity sensor 1, the integrated optical fiber flow velocity sensor 1 includes a sensor body 11, wherein the sensor body 11 can be of a straight cylinder shape; the sensor body 11 includes a fluid contacting end 111 and a sensing end 112; a fluid entrance 1111 and a full-pressure inlet 1112 may be provided on an end surface of the fluid contacting end 111, and a fluid channel 113, a fluid through hole 114, a full-pressure channel 115, a static-pressure channel 116, a low-pressure chamber 117, and a high-pressure chamber 118 are provided inside the sensor body 11; a static-pressure inlet 119 is provided in a sidewall of the sensor body 11. The fluid entrance 1111, the fluid channel 113, and the fluid through hole 114 are sequentially communicated; the fluid contacting end 111 is configured to face a flow direction D of a fluid to be measured, and the fluid can be a liquid fluid or a gaseous fluid; the fluid to be measured flows in from the fluid entrance 1111, and enters the fluid through hole 114 through the fluid channel 113, and a direction F shown in FIG. 2 is the flow direction of the fluid to be measured in the fluid channel 113 and the fluid through hole 114. The full-pressure inlet 1112, the full-pressure channel 115, and the high-pressure chamber 118 are sequentially communicated, the full-pressure inlet 1112 and the fluid entrance 1111 can be configured to be flush, and the fluid to be measured can enter the full-pressure channel 115 from the full-pressure inlet 1112 and then enter the high-pressure chamber 118. The static-pressure inlet 119, the static-pressure channel 116, and the low-pressure chamber 117 are sequentially communicated; the static-pressure inlet 119 is positioned on a different side from the fluid entrance 1111 and the full-pressure inlet 1112, and the static-pressure inlet 119 is in the sidewall of the sensor body 11, so that the static-pressure inlet 119 does not confront the fluid to be measured, and thus few or none of the fluid to be measured enters the static-pressure inlet 119, and therefore, the fluid to be measured generates different pressures in the low-pressure chamber 117 and the high-pressure chamber 118. A first optical fiber sensing element 11A is provided between the low-pressure chamber 117 and the high-pressure chamber 118; a second optical fiber sensing element 11B is provided in the fluid through hole 114, and the second optical fiber sensing element 11B is perpendicular to the flow direction F of the fluid to be measured, or in other words, the second optical fiber sensing element 11B is perpendicular to a wall of the fluid through hole 114, so that the fluid to be measured can vertically flow through a surface of the second optical fiber sensing element 11B.

Figure 3:
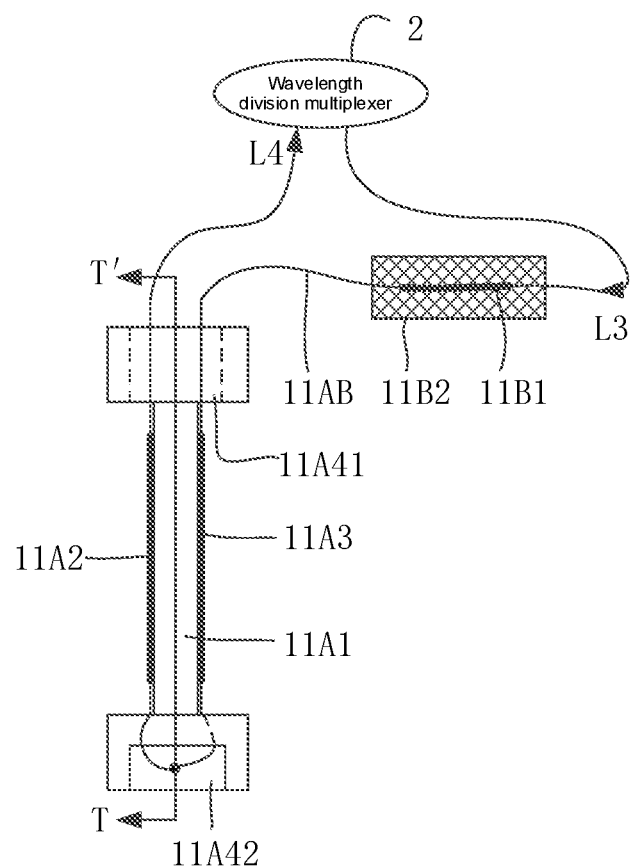
FIG. 3 is a schematic view showing how the first optical fiber sensing element and the second optical fiber sensing element of FIG. 2 are connected.
Figure 4:
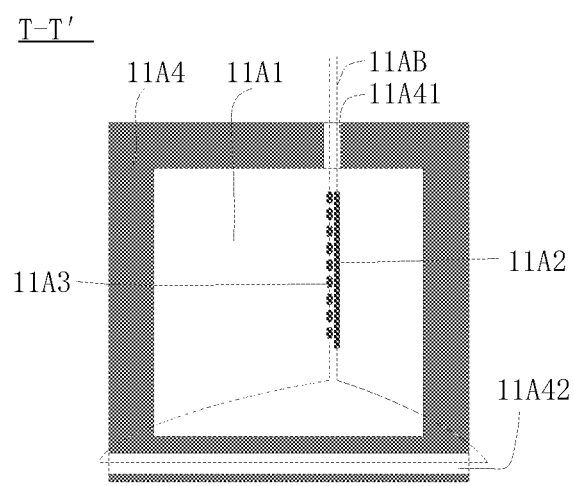
FIG. 4 is a cross-sectional view of the first optical fiber sensing element taken along T-T' of FIG. 3.

FIG. 3 is a schematic view showing how the first optical fiber sensing element and the second optical fiber sensing element of FIG. 2 are connected; FIG. 4 is a cross-sectional view of the first optical fiber sensing element taken along T-T' of FIG. 3. The first optical fiber sensing element 11A may include an elastic diaphragm 11A1, a first optical fiber grating 11A2, a second optical fiber grating 11A3, and a diaphragm base 11A4, wherein the elastic diaphragm 11A1 is embedded in the diaphragm base 11A4, and the diaphragm base 11A4 may be provided with a first through hole 11A41 and a second through hole 11A42, the first through hole 11A41 and the second through hole 11A42 may be positioned at two opposite ends of the elastic diaphragm 11A1, respectively; the single-mode fiber 11AB connecting the first optical fiber grating 11A2 and the second optical fiber grating 11A3 in series passes through the first through hole 11A41, the second through hole 11A42, and then the first through hole 11A41 sequentially; finally, the first optical fiber grating 11A2 and the second optical fiber grating 11A3 are attached to two sides of the elastic diaphragm 11A1, respectively; the first optical fiber grating 11A2 is close to the low-pressure chamber 117, and the second optical fiber grating 11A3 is close to the high-pressure chamber 118; the first optical fiber grating 11A2 and the second optical fiber grating 11A3 can be attached to a surface of the elastic diaphragm 11A1 and symmetrical relative to the elastic diaphragm 11A1, and the size and other material parameters of the elastic diaphragm 11A1 can be determined depending on a specific detection range. It is easy to understand that the single-mode optical fiber 11AB connecting the first optical fiber grating 11A2 and the second optical fiber grating 11A3 in series goes in from the first through hole 11A41 and then goes out from the second through hole 11A42 to make a circle around the elastic diaphragm 11A1, and aperture extension directions of the first through hole 11A41 and the second through hole 11A42 may be perpendicular or include an angle. As shown in FIGS. 3 and 4, the aperture extension directions of the first through hole 11A41 and the second through hole 11A42 are perpendicular. The dashed line shown in FIG. 4 represents the single-mode fiber 11AB on the other side, and the bold dashed line represents the second optical fiber grating 11A3. The second optical fiber sensing element 11B includes a third optical fiber grating 11B1, wherein the first optical fiber grating 11A2, the second optical fiber grating 11A3, and the third optical fiber grating 11B1 are sequentially connected in series through the single-mode optical fiber 11AB. The second optical fiber sensing element 11B further includes a heat conducting sleeve 11B2, and the third optical fiber grating 11 B1 is inside the heat conducting sleeve 11B2. The heat conducting sleeve 11B2 can enhance the mechanical strength of the third optical fiber grating 11B1 and protect the third optical fiber grating 11B1, and the heat conducting sleeve 11B2 can be a metal sleeve with good heat conductivity, other examples of the heat conducting sleeve 11B2 will not specifically defined in the present disclosure. The third optical fiber grating 11B1 can be one of a doped optical fiber grating, a tapered fiber, and a multi-single mode fiber, so long as the third optical fiber grating 11B1 can realize good photothermal conversion, and other types of the third optical fiber grating 11B1 will not specifically defined in the present disclosure.

Further referring to FIGS. 1 and 3, the embodiment herein provides the optical fiber flow velocity measuring apparatus integrating high and low ranges, further including a wavelength division multiplexer 2 into which both ends of the single-mode fiber 11AB are connected; specifically, the single-mode fiber 11AB connecting the first optical fiber grating 11A2 and the second optical fiber grating 11A3 in series has one end thereof connected into the wavelength division multiplexer 2 and the other end thereof connected with the third optical fiber grating 11B1 in series and then into the wavelength division multiplexer 2. The apparatus further includes a pump light source 3 connected with the wavelength division multiplexer 2 through a common optical fiber, and an optical fiber grating demodulator 4 connected with the wavelength division multiplexer 2 through a common optical fiber. The wavelengths processed by the wavelength division multiplexer 2 may be 1480 nm and 1550 nm, respectively, or may be two wavelength bands, which is not specifically defined herein. The pump light source 3 and the optical fiber grating demodulator 4 are respectively connected into interfaces with two wavelengths of the wavelength division multiplexer 2, and the single-mode fiber 11AB of the integrated fiber flow velocity sensor 1 is connected into the other end of the wavelength division multiplexer 2, wherein the pump light source 3 corresponds to the interface with the 1480 nm wavelength, and the optical fiber grating demodulator 4 corresponds to the interface with the 1550 nm wavelength. The apparatus further includes a flow velocity arithmetic unit 5 electrically connected with the optical fiber grating demodulator 4, and the flow velocity arithmetic unit 5 can be used for deriving the final flow velocity of the fluid to be measured by calculating parameters output by the optical fiber grating demodulator.

The principle of the optical fiber flow velocity measuring apparatus integrating high and low ranges provided by the embodiment is briefly described as follows in conjunction with FIGS. 1 to 4: when the optical fiber flow velocity measuring apparatus integrating high and low ranges is started to measure the flow velocity of the fluid, the pump light source 3 firstly emits a first light beam L1, the optical fiber grating demodulator 4 emits a second light beam L2, the first light beam L1 and the second light beam L2 are both transmitted to the wavelength division multiplexer 2 through the common optical fiber, and coupled by the wavelength division multiplexer 2 to obtain a coupled light beam L3, and the coupled light beam L3 is transmitted to the integrated optical fiber flow velocity sensor 1 through the single-mode optical fiber 11AB. As shown in FIG. 3, the coupled light beam L3 enters the single-mode optical fiber 11AB from one end thereof having the third optical fiber grating 11B1 connected in series, passes through the third optical fiber grating 11B1, the second optical fiber grating 11A3, and the first optical fiber grating 11A2, and then goes out as a sensing light beam L4 from the other end. It may also be possible that the coupled light beam L3 enters from one end having the first optical fiber grating 11A2 connected in series and goes out as the sensing light beam L4 from the other end, which is not specifically defined herein. The sensing light beam L4 returns to the optical fiber grating demodulator 4 through the wavelength division multiplexer 2 and the common optical fiber for demodulation of the optical wavelength. If the third optical fiber grating 11B1 is a doped optical fiber grating, light with the 1480 nm wavelength in the coupled light beam L3 is absorbed, and luminous energy is converted into thermal energy through non-radiative transition, and the surface temperature of the third optical fiber grating 11B1 is increased. As a result, a wavelength of light passing through the third optical fiber grating 11B1 is increased. The fluid to be measured carries away partial or more heat when flowing over the surface of the second fiber sensing element 11B, the surface temperature of the third optical fiber grating 11B1 is reduced, and as a result, the wavelength of the light passing through the third optical fiber grating 11B1 is reduced. The flow velocity of the fluid to be measured can be derived by demodulating the wavelength variation of the third optical fiber grating 11B1 by the optical fiber grating demodulator 4, and calculating accordingly by the flow velocity arithmetic unit. If the third optical fiber grating 11B1 is of another type, light with a different light wavelength will be absorbed, but the principles are the same, which will not be described in detail herein. Because the amount of the fluid entering the low-pressure chamber 117 is different from that of the fluid into the high-pressure chamber 118, the pressure in the low-pressure chamber 117 is different from that in the high-pressure chamber 118, and the elastic diaphragm 11A1 deforms correspondingly due to the pressure difference to drive the first optical fiber grating 11A2 and the second optical fiber grating 11A3 attached to the surface of the elastic diaphragm 11A1 to deform, and the deformation of the gratings also causes their wavelength variations. Similarly, the flow velocity of the fluid to be measured can be derived by demodulating the wavelength variations of the first optical fiber grating 11A2 and the second optical fiber grating 11A3 by the optical fiber grating demodulator 4, and calculating accordingly by the flow velocity arithmetic unit 5. The deformation of the elastic diaphragm 11A1 can compensation the temperature and eliminate the influence of ambient temperature. The first optical fiber sensing element 11A drives the grating to deform through the pressure difference between the low-pressure chamber 117 and the high-pressure chamber 118, and in turn reflects the wavelength variation, and the pressure difference between the low-pressure chamber 117 and the high-pressure chamber 118 is defined by the amounts of the fluids to be measured into the low-pressure chamber 117 and the high-pressure chamber 118, hence the first optical fiber sensing element 11A is applicable to high-range measurement. The second optical fiber sensing element 11B reflects the wavelength variation through the fluid to be measured that takes away the heat, which is direct and sensitive, and is thus applicable to low-range measurement. The flow velocity of the fluid to be measured, which is measured by the first optical fiber sensing element 11A, is represented by V1, the flow velocity of the fluid to be measured, which is measured by the second optical fiber sensing element 11 B, is represented by V2, the critical value V0 for the flow velocity can be preset in the flow velocity arithmetic unit 5 for defining a limit between the high range and the low range, and different critical values V0 for the flow velocity can be set according to different fluids to be measured, which is not specifically defined herein. If V1 and V2 are both greater than V0, V1 is output as the final flow velocity; if V1 and V2 are both smaller than or equal to V0, V2 is output as the final flow velocity; if one of V1 and V2 is greater than V0 and the other is not, the one closer to V0 is output as the final flow velocity.

According to the optical fiber flow velocity measuring apparatus and method integrating high and low ranges provided herein, two optical fiber sensing elements based on different measurement principles, which are applicable to high and low ranges measurement, respectively, are provided. The wavelength variations of the gratings in the two optical fiber sensing elements are demodulated by the optical fiber grating demodulator to finally derive two flow velocities through calculation, and the final flow velocity is determined by setting the critical value for the flow velocity. Improved accuracy and sensitivity can be achieved by integrating low and high-range optical fiber sensing elements based on different sensing principles, selecting and outputting the final flow velocity according to specific measurement conditions, wherein the optical fiber gratings reflect the fluid flow velocity through the wavelength variations caused by temperature and deformation, respectively. The apparatus is simple in overall structure and easy to implement.

Figure 5:
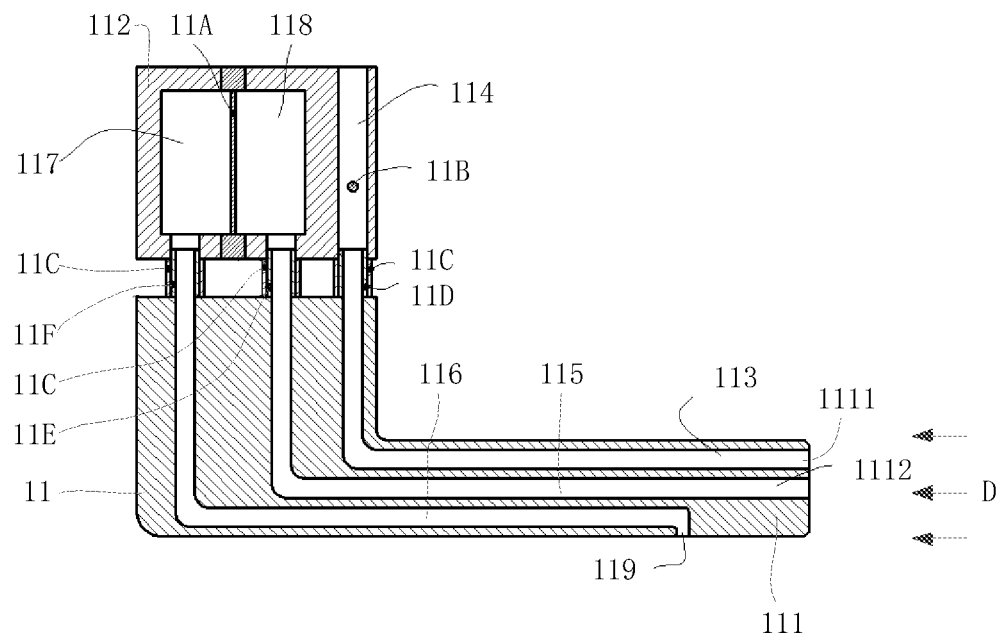
FIG. 5 is a topological diagram of a second optical fiber flow velocity measuring apparatus integrating high and low ranges provided by the present disclosure.

The sensor body 11 shown in FIG. 2 is of a straight cylinder shape, and FIG. 5 is a topological diagram of a second optical fiber flow velocity measuring apparatus integrating high and low ranges provided by the present disclosure. As shown in FIG. 5, the sensor body 11 may also be L-shaped, and correspondingly, the fluid channel 113, the full-pressure channel 115, and the static-pressure channel 116 are all L-shaped. The straight cylindrical and L-shaped sensor bodies 11 can be adapted to different test environments or characteristics of fluids to be tested, which is not specifically defined herein.

As shown in FIG. 2, the fluid contacting end 111 and the sensing end 112 of the sensor body 11 are integral. The integrated sensor body 11 is simple in structure and easy to manufacture.

As shown in FIG. 5, the fluid contacting end 111 and the sensing end 112 of the sensor body 11 are not integral. Specifically, a connection part 11D where the fluid channel 113 is communicated with the fluid through hole 114, a connection part 11E where the full-pressure channel 115 is communicated with the high-pressure chamber 118, and a connection part 11F where the static-pressure channel 116 is communicated with the low-pressure chamber 117 are all fixedly connected by connection structures 11C. The connection structures 11C seal the connection part 11D where the fluid channel 113 is communicated with the fluid through hole 114, the connection part 11E where the full-pressure channel 115 is communicated with the high-pressure chamber 118, and the connection part 11F where the static-pressure channel 116 is communicated with the low-pressure chamber 117 through welding. A split configuration of the sensor body 11 can adapt to sensor bodies 11 of different shapes, and is convenient to carry, and easy to mount and dismount. Both the first optical fiber sensing element and the second optical fiber sensing element are optical fiber gratings, which are easy to integrate.

Figure 6:
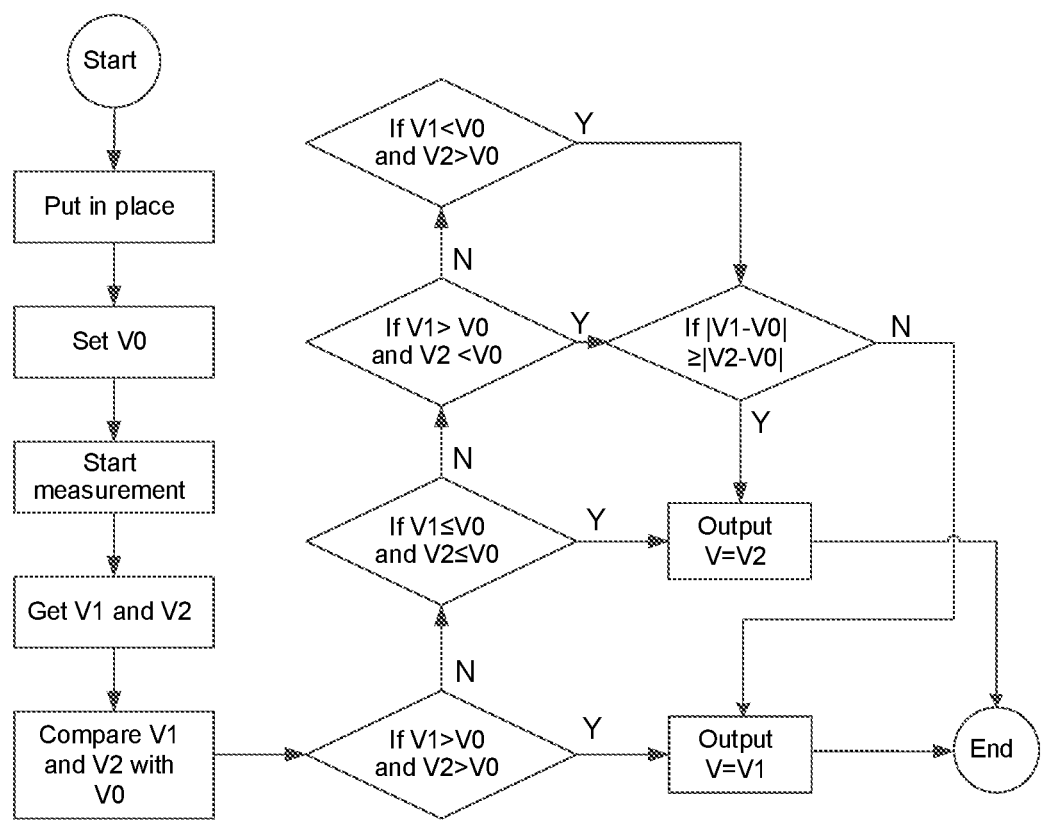
FIG. 6 is a flow chart of an optical fiber flow velocity measuring method integrating high and low ranges provided by the present disclosure.

FIG. 6 is a flow chart of an optical fiber flow velocity measuring method integrating high and low ranges provided by the present disclosure. As shown in FIG. 6, the embodiment of the invention provides the optical fiber flow velocity measuring method integrating high and low ranges, including the steps of:

placing the optical fiber flow velocity measuring apparatus integrating high and low ranges at a position to be measured, and configuring the fluid contacting end of the integrated optical fiber flow velocity sensor to face the flow direction of the fluid;

setting a critical value V0 for the flow velocity;

starting the optical fiber flow velocity measuring apparatus integrating high and low ranges;

obtaining a first flow velocity value V1 measured by the first optical fiber sensing element and a second flow velocity value V2 measured by the second optical fiber sensing element;

comparing the first flow velocity value V1 and the second flow velocity value V2 with the critical value V0 for the flow velocity;

outputting and displaying the first flow velocity value V1 as a final flow velocity V if the first flow velocity value V1 and the second flow velocity value V2 are both greater than the critical value V0 for the flow velocity;

outputting and displaying the second flow velocity value V2 as a final flow velocity V if the first flow velocity value V1 and the second flow velocity value V2 are both smaller than or equal to the critical value V0 for the flow velocity; and calculating a difference between the first flow velocity value V1 and the critical value V0 for the flow velocity and a difference between the second flow velocity value V2 and the critical value V0 for the flow velocity, respectively, and outputting and displaying a flow velocity value with the smallest difference as the final flow velocity V, if one of the first flow velocity value V1 and the second flow velocity value V2 is greater than the critical value V0 for the flow velocity while the other is smaller than the critical value V0 for the flow velocity; specifically, if $V1<V0<V2$ or $V2<V0<V1$, then judging whether $|V1-V0| \geq |V2-V0|$ or $|V1-V0| \leq |V2-V0|$; if $|V1-V0| \geq |V2-V0|$, then $V=V2$; if $|V1-V0| \leq |V2-V0|$, then $V=V1$.

Similarities among the various embodiments herein serve as references for each other.

What is claimed is:

1. An optical fiber flow velocity measuring apparatus integrating high and low ranges, characterized by comprising:
   an integrated optical fiber flow velocity sensor (1), comprising a sensor body (11), wherein the sensor body (11) comprises a fluid contacting end (111) and a sensing end (112); a fluid entrance (1111) and a full-pressure inlet (1112) are provided on an end surface of the fluid contacting end (111), and a fluid channel (113), a fluid through hole (114), a full-pressure channel (115), a static-pressure channel (116), a low-pressure chamber (117), and a high-pressure chamber (118) are provided inside the sensor body (11); a static-pressure inlet (119) is provided in a sidewall of the sensor body (11);
   the fluid entrance (1111), the fluid channel (113), and the fluid through hole (114) are sequentially communicated, the full-pressure inlet (1112), the full-pressure channel (115), and the high-pressure chamber (118) are sequentially communicated, and the static-pressure inlet (119), the static-pressure channel (116), and the low-pressure chamber (117) are sequentially communicated; a first optical fiber sensing element (11A) is provided between the low-pressure chamber (117) and the high-pressure chamber (118); a second optical fiber sensing element (11B) is provided in the fluid through hole (114), and the second optical fiber sensing element (11B) is perpendicular to a flow direction (F) of a fluid to be measured;
   the first optical fiber sensing element (11A) comprises an elastic diaphragm (11A1), a first optical fiber grating (11A2), and a second optical fiber grating (11A3), wherein the first optical fiber grating (11A2) and the second optical fiber grating (11A3) are attached to two sides of the elastic diaphragm (11A1), respectively; the first optical fiber grating (11A2) is close to the low-pressure chamber (117), and the second optical fiber grating (11A3) is close to the high-pressure chamber (118); the second optical fiber sensing element (11B) comprises a third optical fiber grating (11B1); the first optical fiber grating (11A2), the second optical fiber grating (11A3), and the third optical fiber grating (11B1) are sequentially connected in series through a single-mode optical fiber (11AB);
   a wavelength division multiplexer (2), wherein both ends of the single-mode optical fiber (11AB) are connected into the wavelength division multiplexer (2);
   a pump light source (3) connected with the wavelength division multiplexer (2) through a common optical fiber;
   an optical fiber grating demodulator (4) connected with the wavelength division multiplexer (2) through a common optical fiber; and
   a flow velocity arithmetic unit (5) electrically connected with the optical fiber grating demodulator (4).

2. The optical fiber flow velocity measuring apparatus integrating high and low ranges according to claim 1, characterized in that the first optical fiber sensing element (11A) further comprises a diaphragm base (11A4); the elastic diaphragm (11A1) is embedded in the diaphragm base (11A4), the diaphragm base (11A4) is provided with a first through hole (11A41) and a second through hole (11A42), and the first through hole (11A41) and the second through hole (11A42) are positioned at two opposite ends of the elastic diaphragm (11A1), respectively; the single-mode fiber (11AB) connecting the first optical fiber grating (11A2) and the second optical fiber grating (11A3) in series passes through the first through hole (11A41), the second through hole (11A42), and then the first through hole (11A41) sequentially, and the single-mode fiber (11AB) connecting the first optical fiber grating (11A2) and the second optical fiber grating (11A3) in series has one end thereof connected into the wavelength division multiplexer (2) and the other end thereof connected with the third optical fiber grating (11B1) in series.

3. The apparatus optical fiber flow velocity measuring apparatus integrating high and low ranges according to claim 2, characterized in that the second optical fiber sensing element (11B) further comprises a heat conducting sleeve (11B2), and the third optical fiber grating (11B1) is inside the heat conducting sleeve (11B2).

4. The optical fiber flow velocity measuring apparatus integrating high and low ranges according to claim 3, characterized in that the third optical fiber grating (11B1) is one of a doped optical fiber grating, a tapered fiber, and a multi-single mode fiber.

5. The optical fiber flow velocity measuring apparatus integrating high and low ranges according to claim 1, characterized in that the sensor body (11) is L-shaped.

6. The optical fiber flow velocity measuring apparatus integrating high and low ranges according to claim 5, characterized in that the fluid contacting end (111) and the sensing end (112) of the sensor body are integrated.

7. The optical fiber flow velocity measuring apparatus integrating high and low ranges according to claim 5, wherein the fluid contacting end (111) and the sensing end (112) of the sensor body (11) are not integrated;
   a connection part (11D) where the fluid channel (113) is communicated with the fluid through hole (114), a connection part (11E) where the full-pressure channel (115) is communicated with the high-pressure chamber (118), and a connection part (11F) where the static-pressure channel (116) is communicated with the low-pressure chamber (117) are all fixedly connected by connection structures (11C).

8. The optical fiber flow velocity measuring apparatus integrating high and low ranges according to claim 7, characterized in that the connection structures (11C) seal the connection part (11D) where the fluid channel (113) is communicated with the fluid through hole (114), the connection part (11E) where the full-pressure channel (115) is communicated with the high-pressure chamber (118), and the connection part (11F) where the static-pressure channel (116) is communicated with the low-pressure chamber (117) through welding.

9. The optical fiber flow velocity measuring apparatus integrating high and low ranges according to claim 1, characterized in that the sensor body (11) is of a straight cylinder shape.

10. The optical fiber flow velocity measuring apparatus integrating high and low ranges according to claim 9, characterized in that the fluid contacting end (111) and the sensing end (112) of the sensor body are integrated.

11. The optical fiber flow velocity measuring apparatus integrating high and low ranges according to claim 9, wherein the fluid contacting end (111) and the sensing end (112) of the sensor body (11) are not integrated;
   a connection part (11D) where the fluid channel (113) is communicated with the fluid through hole (114), a connection part (11E) where the full-pressure channel (115) is communicated with the high-pressure chamber (118), and a connection part (11F) where the static-pressure channel (116) is communicated with the low-pressure chamber (117) are all fixedly connected by connection structures (11C).

12. An optical fiber flow velocity measuring method integrating high and low measurement ranges, characterized by comprising the steps of:
- placing an optical fiber flow velocity measuring apparatus integrating high and low measurement ranges at a position to be measured, and configuring the fluid contacting end of the integrated optical fiber flow velocity sensor to face the flow direction of the fluid;
- wherein the optical flow velocity measuring apparatus comprises a first optical fiber sensing element and a second optical fiber sensing element;
- setting a critical value for the flow velocity;
- starting optical fiber flow velocity measuring apparatus integrating high and low measurement ranges;
- obtaining a first flow velocity value measured by the first optical fiber sensing element and a second flow velocity value measured by the second optical fiber sensing element;
- comparing the first flow velocity value and the second flow velocity value with the critical value for the flow velocity;
- outputting and displaying the first flow velocity value as a final flow velocity if the first flow velocity value and the second flow velocity value are both greater than the critical value for the flow velocity;
- outputting and displaying the second flow velocity value as a final flow velocity if the first flow velocity value and the second flow velocity value are both smaller than or equal to the critical value for the flow velocity; and
- calculating a difference between the first flow velocity value and the critical value for the flow velocity and a difference between the second flow velocity value and the critical value for the flow velocity, respectively, and outputting and displaying a flow velocity value with the smallest difference as the final flow velocity, if one of the first flow velocity value and the second flow velocity value is greater than the critical value for the flow velocity while the other is smaller than the critical value for the flow velocity.

* * * * *